United States Patent Office 2,770,063
Patented Nov. 13, 1956

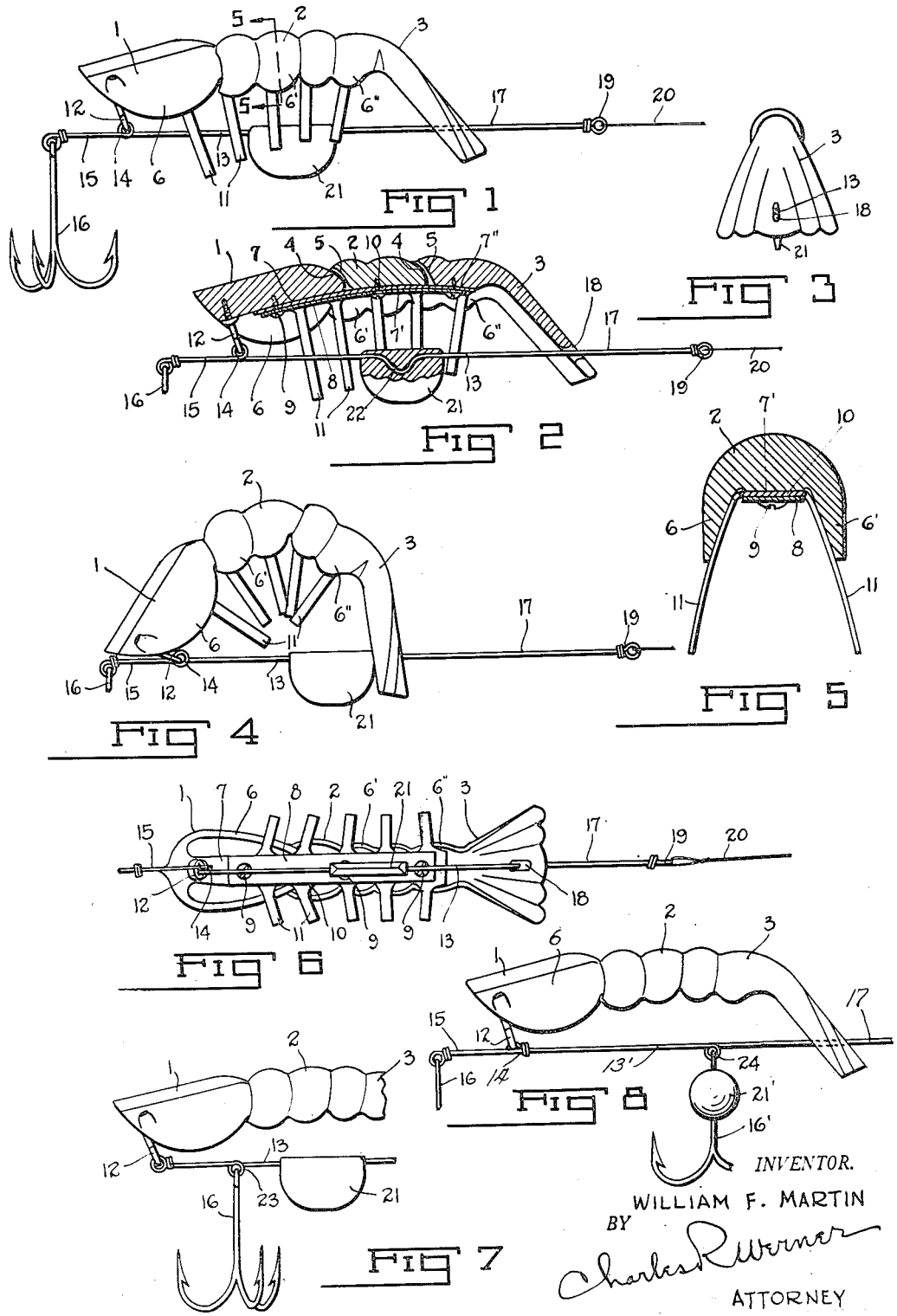

2,770,063

ARTIFICIAL FISHING LURE

William F. Martin, Amarillo, Tex.

Application June 29, 1951, Serial No. 234,340

2 Claims. (Cl. 43—42.02)

This invention relates in general to artificial fishing lures and in particular to an artificial shrimp formed with an articulated body and having an actuating rod to produce life-like animation of the lure when the rod is actuated.

This application includes various improvements over the lure shown in my pending application, Serial Number 779,550, filed October 13, 1947, now Patent No. 2,663,964, issued December 29, 1953, for "Artificial Fishing Bait."

In the design of my improved lure one of the objects is to enhance the natural appearance and animation thereof by providing a plurality of rigid, interacting segments secured to a resilient member normally urging and retaining the segments in linear relation but capable of permitting the segments forming the body to arch in a manner natural to a live shrimp, the resilient member returning the segments to linear alignment from that arched position.

One more object of the invention is to provide an articulated body, the parts of which are carried by a spring member to provide for arching of the body, the resilience of the spring being such as to permit the articulated body to quiver and will resist arching of the body during trolling and which will permit arching upon a sudden jerk on the lure.

And another object of the invention is to provide a lure of the class described employing a spring mounted articulated body, a rod carried by one end of the body and passing through the other end of the body, whereby movement of the rod will cause arching of the articulated body.

And still another object of the invention is to provide a lure formed of an articulated spring-mounted body with a substantially rigid rod carried by one end of the body and passing through the other end of the body to create an arching of the body at will, the rod preventing stress on the body, a weight carried by the rod acting as a stabilizer to retain the body upright in natural position in the water, the weigh being fixed in position on the rod at a predetermined distance from the end of the body through which the rod passes to act as a stop preventing excessive arching of the body.

One other object of the invention is to provide a lure formed of an articulated spring-mounted body, an actuating member for arching the body and one or more hooks carried by the actuating member.

Other objects and advantages, as well as the construction and operation of my invention will be apparent by reference to the following description in connection with the accompanying drawing in which:

Fig. 1 is a side elevation of one form of a lure comprising my invention, shown in normal position.

Fig. 2 is a longitudinal sectional view through the lure shown in Fig. 1, part of the hook being omitted.

Fig. 3 is a rear elevational view of the lure shown in Fig. 1, the hook being omitted.

Fig. 4 is a longitudinal side elevational view of the lure shown in Fig. 1 in arched position, part of the hook being omitted.

Fig. 5 is an enlarged cross sectional view on the line 5—5 of Fig. 1.

Fig. 6 is a bottom plan view of the lure shown in Fig. 1, the hook being omitted.

Fig. 7 is a fragmentary side elevational view showing a modified form of my invention with the hook in a different location.

Fig. 8 is a side elevational view showing another modified form with a hook incorporated as part of the weight.

Referring now to the drawing by numerals of reference, the articulated body comprises a head section 1, one or more intermediate sections 2 and a tail section 3, the latter being formed at an approximate angle of 45° to the rest of the body as shown and for the purpose hereinafter specified.

As seen in the longitudinal cross section, Fig. 2, the rear of the head and intermediate sections are curved as at 4 to correspond to the inner curved configurations 5 on the intermediate and tail sections, thereby retaining a relatively normal shrimp body appearance when the articulated body is arched.

Looking at the body along the longitudinal axis as shown in Fig. 5, it will be seen that the sections of the body are substantially of inverted U-shape in cross section with side flanges 6, 6' and 6", and a central flat portion 7, 7' and 7" to which a preferably flat resilient spring member 8, is suitably secured to each section by fastening members 9.

A leg simulating member 10 of flexible material preferably red in color, is held in place between the spring 8 and the body sections, the legs 11 bearing against the side flanges 6, 6' and 6" to hold said legs in a natural downwardly extending position.

A suitable eye 12 is secured to the head section 1 of the body and an actuator rod 13, substantially rigid in form, is secured by means of loop 14 to said eye, a forward extension 15 of the rod carrying the hook 16, the rearwardly extending portion 17 of the rod passing through a suitable opening 18 in the tail portion 3 of the articulated body, and terminating in an eye 19 to which a line 20, a portion of which is shown, may be suitably secured.

A weight 21 is rigidly fastened to the rod 13 at a suitable bend 22 therein, the weight acting as a stabilizer, holding the lure upright in the water. In mounting the weight it is so spaced from the tail 3 as to act as a stop when the lure is arched as seen in Fig. 4. This will prevent sharp bending or kinking of the flat spring member 8.

It will be seen that the spring 8 will normally urge the body sections into a substantially linear alignment, and with the side flanges 6, 6' and 6" will prevent any lateral distortion of the body sections relative to each other.

With the lure carried on a line during trolling, the resilience of the spring 8 is so proportioned that the lure will quiver as if alive while going through the water. Upon a sudden jerk on the line by the fisherman, the flat tail 3 will act as a resistance member to the water and the rod will bring the head section down, arching the articulated body in natural simulation of a frightened shrimp which arches as it darts backwards. The angle of the tail section 3 will urge the lure downwardly into the water. Release of pull on the rod 13 will permit the spring 8 to bring the articulated body back to linear alignment.

The rod 13, stabilizer weight 21 and hook 16 are formed in a unitary structure, the pull on the line and any strain induced by the catching of a fish all passing through the rod 13 with no strain whatsoever on the articulated body.

I have shown different modifications wherein the hook may be placed in different locations. In Fig. 7 a loop 23 may be located on the rod 13 rearwardly of the eye 14, with a hook 16 carried by loop 23.

In Fig. 8, a further modification is shown wherein a loop 24 is provided between the rearwardly extending rod portion 17' and the rod 13', a hook 16' with a weight 21' thereon being carried by the loop 24, said loop being at the proper distance from the tail to act as a stop and provide for the proper amount of arching.

It is obvious that changes in form, proportion and details of construction may be resorted to without departing from the spirit of my invention and I reserve all rights to such changes as come within the scope of these specifications and the claims which follow.

What I claim as new and desire to secure by Letters Patent is:

1. An artificial lure comprising an articulated body including a head portion and a tail portion, a resilient member carried by the body and normally urging said body into linear alignment and permitting bending of the body to an arched position, an actuating rod secured to one end of the articulated body externally thereof and passing through the other end of said body for arching said body, an eye carried by the rod intermediate the head portion and the tail portion, and a hook and weight member carried by the eye, said eye acting as a stop to permit a predetermined arching of the lure body.

2. An artificial lure comprising an articulated body, a resilient member carried by the body and normally urging said body into linear alignment and permitting bending of the body to an arched position, an actuating rod secured to one end of the articulated body externally thereof and passing through the other end of said body for arching the body, a stabilizing weight secured to the rod at a point where the weight will act as a stop member upon contact with the tail portion, and a hook member carried by the rod.

References Cited in the file of this patent

UNITED STATES PATENTS

| | | |
|---|---|---|
| 879,869 | Hansen | Feb. 25, 1908 |
| 1,582,171 | Foss | Apr. 27, 1926 |
| 1,792,366 | Ettles | Feb. 10, 1931 |
| 1,813,722 | Wright et al. | July 7, 1931 |
| 2,218,280 | Deering | Oct. 15, 1940 |
| 2,290,433 | Jeffers | July 21, 1942 |
| 2,303,097 | Townsend et al. | Nov. 24, 1942 |
| 2,522,179 | Jensen et al. | Sept. 12, 1950 |
| 2,663,964 | Martin | Dec. 29, 1953 |